(12) United States Patent
Zhang et al.

(10) Patent No.: US 8,238,123 B2
(45) Date of Patent: Aug. 7, 2012

(54) FREQUENCY LIMITATION METHOD WITH TIME HYSTERESIS USED IN QUASI-RESONANT CONTROL

(75) Inventors: Junming Zhang, Hangzhou (CN); Yuanchang Ren, Hangzhou (CN); Jin Hu, Hangzhou (CN); Huanyu Lu, Beijing (CN); Yang Shi, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 273 days.

(21) Appl. No.: 12/817,002

(22) Filed: Jun. 16, 2010

(65) Prior Publication Data

US 2011/0007526 A1    Jan. 13, 2011

(30) Foreign Application Priority Data

Jun. 16, 2009    (CN) .......................... 2009 1 0303275

(51) Int. Cl.
*H02M 3/335*    (2006.01)

(52) U.S. Cl. ............... 363/21.12; 363/21.13; 363/21.14; 363/21.17; 363/21.18

(58) Field of Classification Search ............... 363/21.12, 363/21.13, 21.14, 21.17, 21.18
See application file for complete search history.

(56) References Cited

U.S. PATENT DOCUMENTS

| | | | |
|---|---|---|---|
| 6,469,484 B2 * | 10/2002 | L'Hermite et al. | 323/284 |
| 7,898,823 B2 * | 3/2011 | Wu | 363/21.12 |
| 2008/0278974 A1 * | 11/2008 | Wu | 363/21.18 |

* cited by examiner

*Primary Examiner* — Bao Q Vu
(74) *Attorney, Agent, or Firm* — Perkins Coie LLP

(57) ABSTRACT

A frequency limitation method used in quasi-resonant control of a switching regulator is disclosed. The switching frequency is limited through setting a minimum time limit, such as a minimum switching period or a minimum OFF time. The minimum time limit may be a first time limit or a second time limit. The minimum time limit is changed into another value if the minimum voltage point approaches the minimum time limit point, so as to eliminate the audible noise.

18 Claims, 6 Drawing Sheets

FREQUENCY LIMITATION METHOD WITH TIME HYSTERESIS USED IN QUASI-RESONANT CONTROL

CROSS-REFERENCE TO RELATED APPLICATION

This application claims priority to, and the benefit of, Chinese Patent Application No. 200910303275.1 filed on Jun. 16, 2009, which is incorporated herein by reference in its entirety.

TECHNICAL FIELD

The present invention generally relates to electrical circuits, and more particularly but not exclusively to switching regulators under quasi-resonant control.

BACKGROUND

A DC voltage source is used as the power supply in many electronic devices. Generally, the DC voltage is derived from an AC power source. The AC voltage is rectified into an unregulated DC voltage by a rectifier bridge. The unregulated DC voltage is converted into a stable DC voltage as needed by a switching regulator.

A transformer or inductor is usually used as a tank element in the switching regulator. For example, a transformer is used in a flyback converter. A switch is electrically coupled to the primary winding of the transformer. The switch is turned ON and OFF so as to alternately store energy in the transformer and transfer the stored energy to the secondary winding of the transformer. An output capacitor is electrically coupled to the secondary winding of the transformer and a rectified voltage is generated thereon. The rectified voltage provides the DC output voltage of the switched power supply. The DC output voltage increases and decreases inversely with the load. The heavier the load, which means the higher the output current, the lower the output voltage, and vice versa. Generally, the DC output voltage is fed back to control compensation for the variation of the load.

There are two primary types of control methods used in the switching regulator. One is fixed frequency control and the other is variable frequency control. Although fixed frequency control is more widely used, it suffers from high switching loss and efficiency variation with load or input voltage due to the variable voltage across the switch.

An example of variable frequency control is quasi-resonant (QR) control. FIG. 1 shows an example waveform of a switching regulator circuit under QR control, wherein $V_s$ is the voltage across the switch, CTRL is a control signal controlling the ON and OFF of the switch, and $I_t$ is the current flowing through the tank element. In the example of FIG. 1, the switching regulator works under DCM (discontinuous current mode). After the current $I_t$ flowing through the tank element goes to zero, the tank element becomes resonant with the parasitic capacitance of the switch. The switch is turned ON when the voltage $V_s$ across the switch reaches its resonant valley so as to reduce switching loss. The switch is turned OFF when the current $I_t$ flowing through the tank element becomes larger than a threshold level, which in the example of FIG. 1 may be a feedback signal related to the output voltage of the regulator.

Under QR control, the lighter the load, the shorter the ON time and OFF time of the switch. So under light load and high input voltage condition, the switching frequency may become too high and cause serious EMI (electromagnetic interference) problem. The EMI may not only reduce the quality of the power network, but also influence electrical devices connected to or placed near the switching power supply. Therefore, the switching frequency should be limited, for example, to be lower than 150 kHz.

Switching frequency may be limited by setting a minimum time limit, such as a minimum switching period or a minimum switch turn OFF time. In this approach, the switch can only be turned ON at the minimum voltage point after the minimum time limit, so as to limit the switching frequency while keeping the valley switching feature. However, this frequency limitation method may cause audible noise due to frequency hopping.

FIG. 2 is a waveform of a conventional QR controlled switching regulator with frequency limitation, wherein $T_{limit}$ is the minimum OFF time, and point A is a minimum voltage point across the switch. In practical application, the position of the minimum voltage point A may vary due to disturbance in the circuit. If the minimum voltage point A is slightly later, which means it occurs after the minimum OFF time $T_{limit}$, the switch will be turned ON immediately. If the minimum voltage point A is slightly earlier, which means it occurs within the minimum OFF time $T_{limit}$, the switch will be turned ON at the next minimum voltage point. From the description above, the OFF time may vary due to disturbance even when the load and the input voltage do not change. The variation of the OFF time will cause the switching frequency to hop in several switching periods, which may generate low frequency audible noise.

SUMMARY

In one embodiment, a switching frequency of quasi-resonant switching regulator circuit is limited by setting a minimum time limit, such as a minimum switching period or a minimum OFF time. The minimum time limit may be a first time limit or a second time limit. The minimum time limit may be changed into another time limit when a minimum voltage point across a switch of the regulator circuit occurs within a time period after the minimum time limit.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to embodiments of the invention, examples of which are illustrated in the accompanying drawings. While the invention will be described in conjunction with the embodiments, it will be understood that the invention is not so limited. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
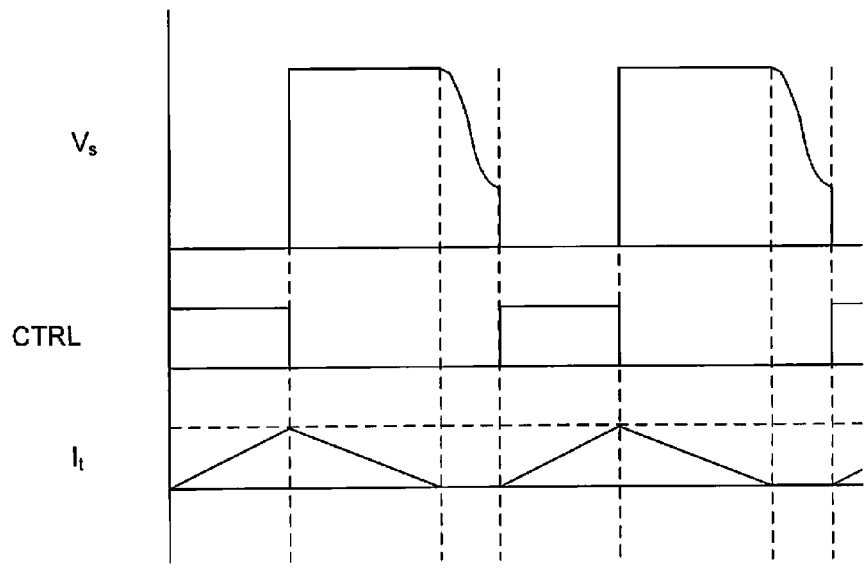
FIG. 1 is a waveform of a prior art switching regulator circuit under quasi-resonant control.
Figure 2:
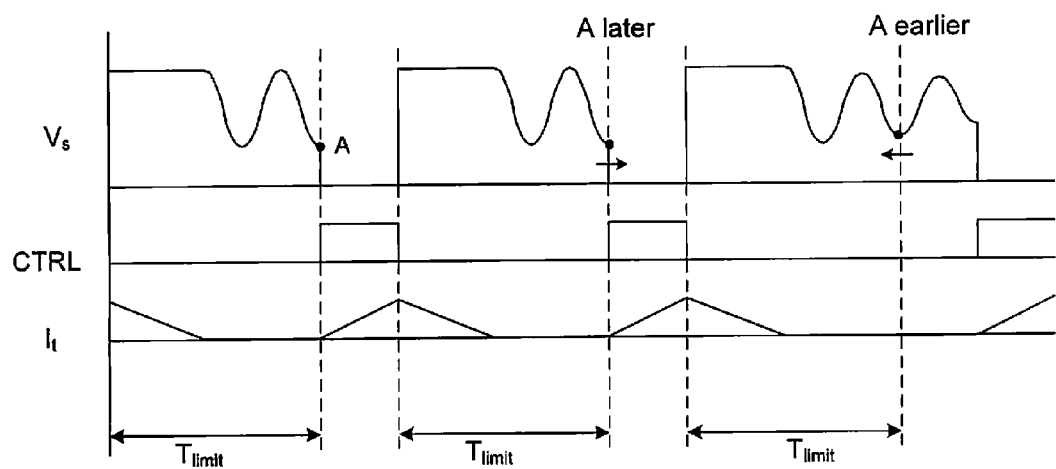
FIG. 2 is a waveform of a prior art quasi-resonant controlled switching regulator circuit with frequency limitation.
Figure 3A:
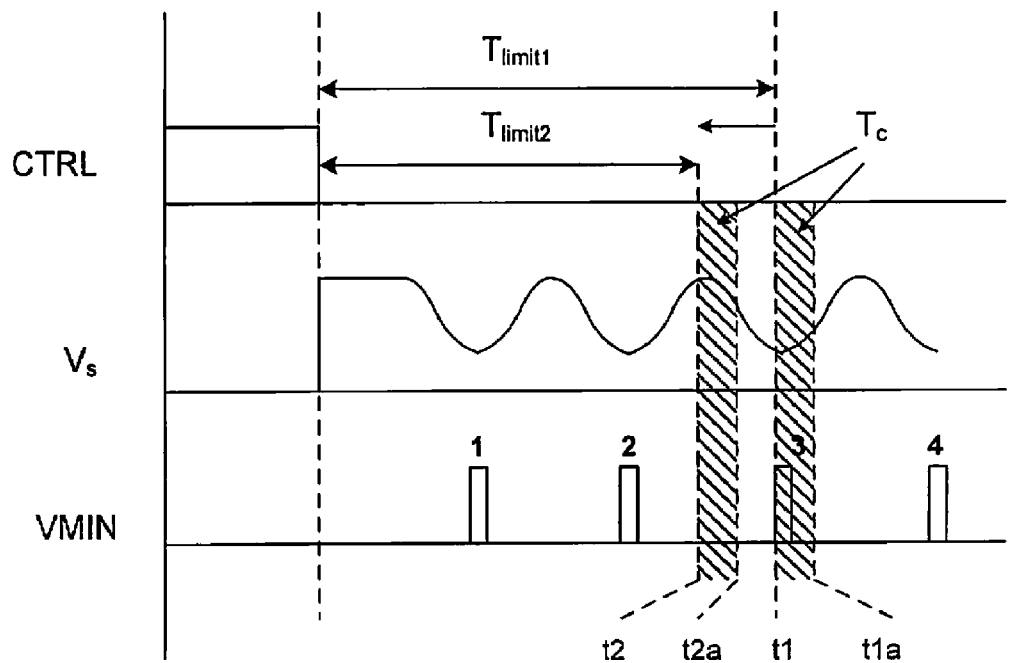
FIGS. 3A and 3B are example waveforms of a quasi-resonant controlled switching regulator circuit with frequency limitation, in accordance with one embodiment of the present invention.
Figure 3B:
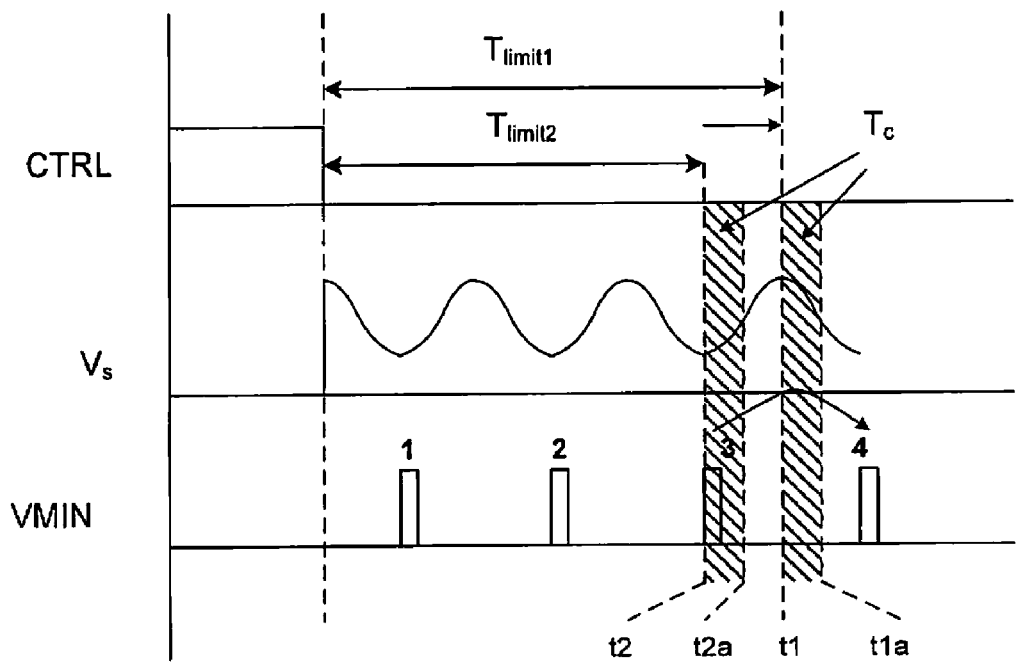

FIGS. 3A and 3B show example waveforms of a QR controlled switching regulator with frequency limitation, in accordance with one embodiment of the present invention. In the examples of FIGS. 3A and 3B, there are two time limits namely, a first time limit $T_{limit1}$ and a second time limit $T_{limit2}$. The time limits $T_{limit1}$ and $T_{limit2}$ each constitutes a minimum OFF time. Each of the time limits $T_{limit1}$ and $T_{limit2}$ includes a small time period $T_c$ for logic operation.

In the example of FIGS. 3A and 3B, VMIN is a minimum voltage signal comprising multiple pulses. The minimum voltage signal VMIN may be generated by comparing the switch voltage $V_s$ across the switch to a threshold. As can be appreciated, the minimum voltage signal VMIN comprises the information of the minimum voltage point. The switch is turned ON when the minimum voltage signal VMIN is active after the minimum OFF time. In one embodiment, if the switch voltage $V_s$ is smaller than the threshold, the minimum voltage signal VMIN is active, which is a HIGH level in this example. Otherwise, the minimum voltage signal is inactive, which in this example is a LOW level. The minimum voltage signal VMIN is rising edge effective in these examples.

When the effective minimum voltage signal VMIN occurs (i.e., active) during a time period $T_c$ after a time limit, the time limit will be changed to another time limit. For example, if the minimum voltage signal VMIN occurs during the time period $T_c$ after the first time limit $T_{limit1}$, the time limit of the regulator will be changed to the second time limit $T_{limit2}$. This allows the minimum voltage point to occur away from the time limit, which advantageously prevents frequency hopping and resulting audible noise In FIG. 3A, the present minimum OFF time is assumed to be the first time limit $T_{limit1}$. The first and second pulses of the minimum voltage signal VMIN are blanked out because they are within the first time limit $T_{limit1}$. The switch would thus turn ON at the third pulse of the minimum voltage signal VMIN. In this embodiment, because the third pulse occurs within the time period $T_c$, which comprises a time window between t1 and t1a, the minimum OFF time of the regulator will be changed to the second time limit $T_{limit2}$. That is, the minimum OFF time point is changed from t1 to t2, and the switch will be turned ON at the third pulse of the minimum voltage signal VMIN. Because the third pulse is far away from the minimum OFF time point t2, audible noise is advantageously prevented.

In FIG. 3B, the third pulse is relatively close to the present minimum OFF time point t2 because of load or input voltage variation. More specifically, the third pulse of the minimum voltage signal VMIN occurs within the time period $T_c$, which comprises a time window between t2 and t2a, after the time limit $T_{limit2}$. Accordingly, the minimum OFF time is changed to the first time limit $T_{limit1}$ as soon as the third pulse enters the time period $T_c$ after the time limit $T_{limit2}$. In other words, the minimum OFF time point is changed from t2 to t1. The third pulse is blanked out because it is now within the first time limit $T_{limit1}$. This results in the switch being turned ON at the fourth pulse instead of the third pulse. Because the fourth pulse is relatively far from the minimum OFF time point t1, audible noise is prevented. Furthermore, since the OFF time is increased, the switching frequency decreases, and the peak current following through the tank element will be increased slightly to provide the same output power. The OFF time will be further slightly increased, which induces the minimum voltage point to be moved farther from the minimum OFF time point.

The maximum difference between the first and second time limits may be half of the resonant period of the tank element and the parasitic capacitance of the switch. In one embodiment, the difference between the first and second time limits is one half of the resonant period, and the time period $T_c$ is one fourth of the resonant period. The difference between the first and second time limits may also be fixed.

The following embodiments are explained using an AC/DC converter as an example. However, it will be obvious to one of ordinary skill in the art that the present invention may also be applied to DC/DC topologies, such as Buck, Boost, Buck-Boost, Flyback, Forward and so on.

Figure 4:
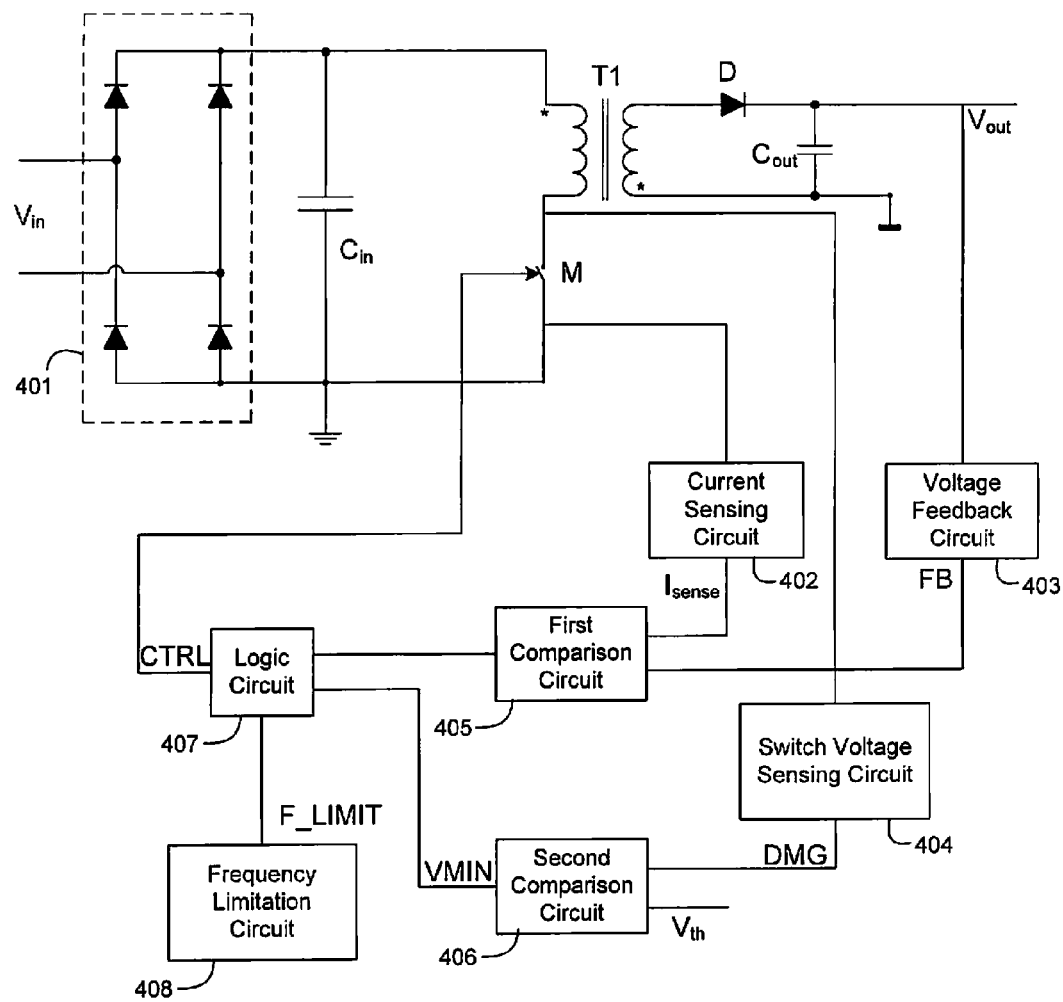
FIG. 4 is a block diagram of a quasi-resonant controlled switching regulator circuit with frequency limitation, in accordance with one embodiment of the present invention.

FIG. 4 shows a block diagram of a QR controlled switching regulator circuit with frequency limitation, in accordance with one embodiment of the present invention. In the example of FIG. 4, the switching regulator circuit comprises a rectifier bridge 401, an input capacitor $C_{in}$, a transformer T1, a switch M, a diode D, an output capacitor $C_{out}$, a current sensing circuit 402, a voltage feedback circuit 403, a switch voltage sensing circuit 404, a first comparison circuit 405, a second comparison circuit 406, a logic circuit 407 and a frequency limitation circuit 408. The switching regulator utilizes a QR control method and works under DCM. The transformer T1 stores energy when the switch M is ON. The stored energy is transferred to the load when the switch M is OFF. After all the stored energy is transferred to the load, the magnetization inductance of the transformer T1 becomes resonant with the parasitic capacitance of the switch M. The switch M is turned ON when the voltage across the switch M reaches its resonant valley, so as to reduce power loss and enhance efficiency.

The rectifier bridge 401 receives an AC input voltage $V_{in}$ and converts it into an unregulated DC voltage. The input capacitor $C_{in}$ is electrically connected between the output terminals of the rectifier bridge 401. One terminal of the input capacitor $C_{in}$ is electrically connected to one terminal of the primary winding of the transformer T1. The other terminal of the input capacitor $C_{in}$ is grounded. The switch M is electrically coupled between the other terminal of the primary winding or the transformer T1 and the ground. The switch M may be any controllable semiconductor device, such as MOSFET (metal oxide semiconductor field effect transistor), IGBT (isolated gate bipolar transistor) and so on. The anode of the diode D is electrically connected to one terminal of the secondary winding of the transformer T1, while the cathode is electrically connected to one terminal of the output capacitor $C_{out}$. The other terminal of the output capacitor $C_{out}$ is electrically connected to the other terminal of the secondary winding of the transformer T1. The voltage across the output capacitor $C_{out}$ is the output voltage $V_{out}$ of the switching regulator. The diode D is replaced by a synchronous switch in other embodiments.

The current sensing circuit 402 is electrically coupled to the switch M to sense the current flowing through the switch M and generate a current sensing signal $I_{sense}$ representative of it. The current sensing circuit 402 may be realized by a resistor, transformer, current amplifier and so on. The voltage feedback circuit 403 is electrically coupled to the output terminals of the switching regulator to sense the output voltage $V_{out}$ and generate a feedback signal FB accordingly. The voltage feedback circuit 403 may comprise a photocoupler or a transformer. In one embodiment, the transformer T1 further comprises an auxiliary winding. The voltage feedback circuit 403 is electrically coupled to the auxiliary winding to sense the voltage across it. The voltage across the auxiliary winding can represent the output voltage $V_{out}$. The auxiliary winding may be placed on the primary side, or the secondary side of the transformer T1. The switch voltage sensing circuit 404 is electrically coupled to the switch M to sense the voltage across the switch M and generate a switch voltage sensing signal DMG accordingly. In one embodiment, the transformer T1 further comprises an auxiliary winding. The switch voltage sensing circuit 404 is electrically coupled to the auxiliary winding to sense the voltage across it and generate the switch voltage sensing signal DMG accordingly.

The first comparison circuit 405 is electrically coupled to the current sensing circuit 402 and the voltage feedback circuit 403 to compare the current sensing signal $I_{sense}$ with the feedback signal FB. The second comparison circuit 406 is electrically coupled to the switch voltage sensing circuit 404 to compare the switch voltage sensing signal DMG with a threshold $V_{th}$ and generate the minimum voltage signal VMIN accordingly. The logic circuit 407 is electrically coupled to the first comparison circuit 405, the second comparison circuit 406 and the switch M, and generates a control signal CTRL to control the ON and OFF of the switch M based on the comparison results. The switch M is turned OFF when the current sensing signal $I_{sense}$ is larger than the feedback signal FB, and turned ON when the switch voltage sensing signal DMG is smaller then the threshold $V_{th}$. The frequency limitation circuit 408 is electrically coupled to the logic circuit 407, and provides a frequency limitation signal F_LIMIT to limit the switching frequency of the switch M. The switching frequency of the switch M is limited by setting a minimum time limit (minimum switching period or minimum OFF time). There may be two time limits that can be chosen as the minimum time limit. If the minimum voltage point approaches the minimum time limit point, the minimum time limit will be changed to another value to maintain enough margin between the minimum voltage point and the minimum time limit point. This advantageously prevents frequency hopping and resulting audible noise.

Figure 5:
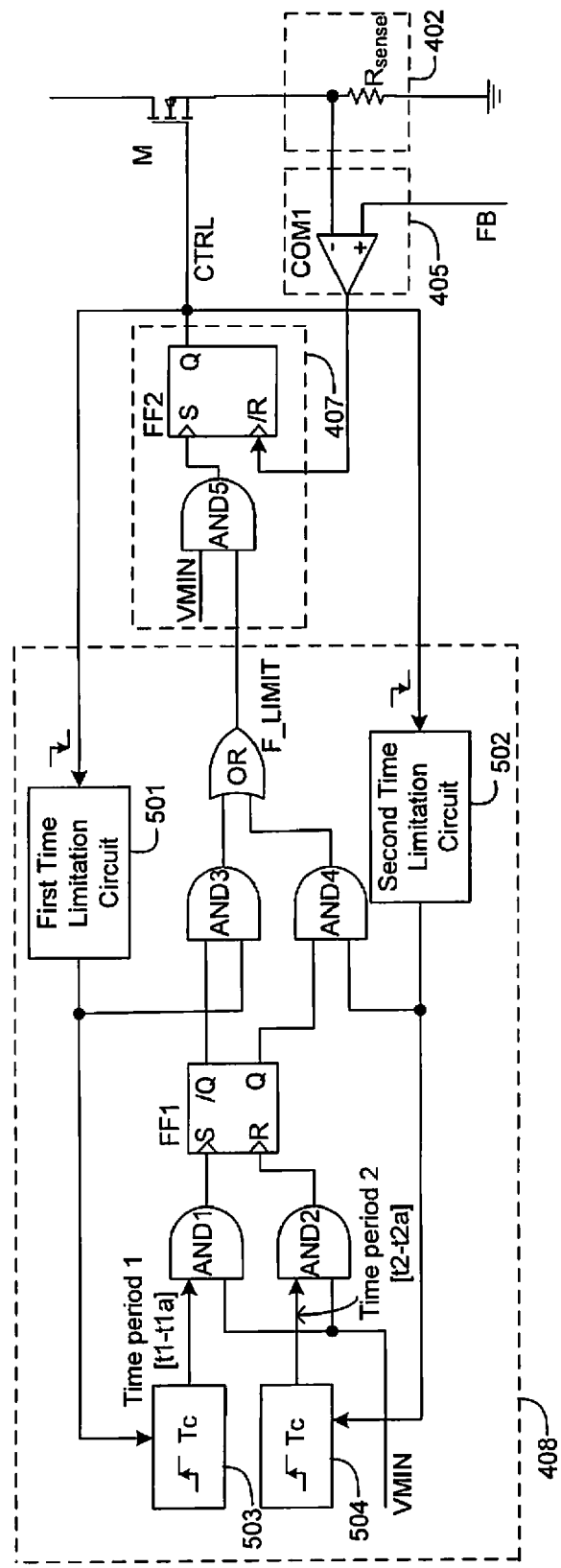
FIG. 5 illustrates a part of the switching regulator circuit of FIG. 4, in accordance with one embodiment of the present invention.

FIG. 5 illustrates a part of the switching regulator circuit of FIG. 4, in accordance with one embodiment of the present invention. FIG. 5 shows the switch M, the current sensing circuit 402, the first comparison circuit 405, the logic circuit 407 and the frequency limitation circuit 408. The switch M is an nMOS (n-type MOSFET) in this example. The switching frequency of the switch M is limited by setting a minimum OFF time, which in this example is either the first time limit $T_{limit1}$ or the second time limit $T_{limit2}$. The current sensing circuit 402 comprises a resistor $R_{sense}$ which is electrically connected between the source of the switch M and the ground. The voltage across the resistor $R_{sense}$ is the current sensing signal $I_{sense}$. The first comparison circuit 405 comprises a comparator COM1. The non-inverting input terminal of the comparator COM1 is electrically connected to the voltage feedback circuit 403 to receive the feedback signal FB. The inverting input terminal of the comparator COM1 is electrically connected to the source of the switch M and the resistor $R_{sense}$ to receive the current sensing signal $I_{sense}$.

The logic circuit 407 comprises a gate AND5 and a flip-flop FF2. One input terminal of the gate AND5 is electrically connected to the second comparison circuit 406 to receive the minimum voltage signal VMIN. The other input terminal of the gate AND5 is electrically connected to the frequency limitation circuit 408 to receive the frequency limitation signal F_LIMIT. The flip-flop FF2 comprises a set terminal S and a reset terminal $\overline{R}$, wherein the set terminal S is rising edge effective and the reset terminal $\overline{R}$ is falling edge effective. The reset terminal $\overline{R}$ of the flip-flop FF2 is electrically connected to the output terminal of the comparator COM1. The set terminal of the flip-flop FF2 is electrically connected to the output terminal of the gate AND5. The output terminal Q of the flip-flop FF2 is electrically coupled to the gate of the switch M to provide the control signal CTRL. The switch M is turned ON when the control signal CTRL is HIGH level, and turned OFF when the control signal is LOW level.

The frequency limitation circuit 408 comprises a first time limitation circuit 501, a second time limitation circuit 502, one-shot circuits 503 and 504, gates AND1~AND4, flip-flop FF1 and gate OR. The first time limitation circuit 501 is electrically connected to the output terminal of the flip-flop FF2 to receive the control signal CTRL, and generates a first time limitation signal accordingly. The first time limitation signal becomes LOW level at the falling edge of the control signal CTRL, and remains LOW for $T_{limit1}$. The second time limitation circuit 502 is electrically connected to the output terminal of the flip-flop FF2 to receive the control signal CTRL, and generates a second time limitation signal accordingly. The second time limitation signal becomes LOW level at the falling edge of the control signal CTRL, and remains LOW for $T_{limit2}$.

The one-shot circuit 503 is electrically connected to the first time limitation circuit 501 to receive the first time limitation signal, and generates a first pulse signal accordingly. The first pulse signal becomes HIGH level at the rising edge of the first time limitation signal, and remains HIGH for the time period $T_c$. The one-shot circuit 504 is electrically connected to the second time limitation circuit 502 to receive the second time limitation signal, and generates a second pulse signal accordingly. The second pulse signal becomes HIGH level at the rising edge of the second time limitation signal, and remains HIGH for the time period $T_c$.

One input terminal of the gate AND1 is electrically connected to the one-shot circuit 503 to receive the first pulse signal. The other terminal of the gate AND1 is electrically connected to the second comparison circuit 406 to receive the minimum voltage signal VMIN. One input terminal of the gate AND2 is electrically to the one-shot circuit 504 to receive the second pulse signal. The other terminal of the gate AND2 is electrically connected to the second comparison circuit 406 to receive the minimum voltage signal VMIN.

The flip-flop FF1 comprises a set terminal S, a reset terminal R, a non-inverting output terminal Q and an inverting output terminal $\overline{Q}$, wherein the set terminal S and reset terminal R are both rising edge effective. The set terminal S of the flip-flop FF1 is electrically connected to the output terminal of the gate AND1. The reset terminal R of the flip-flop FF1 is electrically connected to the output terminal of the gate AND2. One input terminal of the gate AND3 is electrically connected to the first time limitation circuit 501 to receive the first time limitation signal. The other input terminal of the gate AND3 is electrically connected to the inverting output terminal $\overline{Q}$ of the flip-flop FF1.

One input terminal of the gate AND4 is electrically connected to the second time limitation circuit 502 to receive the second time limitation signal. The other input terminal of the gate AND4 is electrically connected to the non-inverting output terminal Q of the flip-flop FF1. Two input terminals of the gate OR are electrically connected to the output terminals of the gate AND3 and AND4 separately. The output terminal of the gate OR provides the frequency limitation signal F_LIMIT.

The falling edge of the control signal CTRL triggers the first and second time limitation signals to be LOW simultaneously. The two time limitation signals remain LOW during the corresponding time limit, and become HIGH once the corresponding time limit is over. The rising edge of the time limitation signals will trigger the corresponding one-shot circuit to generate a time period separately, such as the bias areas shown in FIGS. 3A and 3B.

If the minimum voltage point appears during the time period 1 [t1-t1a], the flip-flop FF1 is set. The non-inverting output signal of the flip-flop FF1 is HIGH and the inverting output signal is LOW. The second time limitation signal is chosen to be the frequency limitation signal F_LIMIT while the first time limitation signal is shielded. The second time limit $T_{limit2}$ is chosen to be the minimum OFF time as a result, and the minimum voltage signal VMIN will be sent into the flip-flop FF2 only after the second time limit $T_{limit2}$ is reached. Similarly, if the minimum voltage point appears during the time period 2 [t2-t2a], the flip-flop FF1 is reset. The non-inverting output signal of the flip-flop FF1 is LOW and the inverting output signal is HIGH. The first time limitation signal is chosen to be the frequency limitation signal F_LIMIT while the second time limitation signal is shielded. The first time limit $T_{limit1}$ is chosen to be the minimum OFF time, and the minimum voltage signal VMIN will be sent into the flip-flop FF2 only after the first time limit $T_{limit1}$ is reached.

In one embodiment, a first time limitation signal is generated using a single time limitation circuit, and a second time limitation signal is generated by delaying the first time limitation signal.

Figure 6:
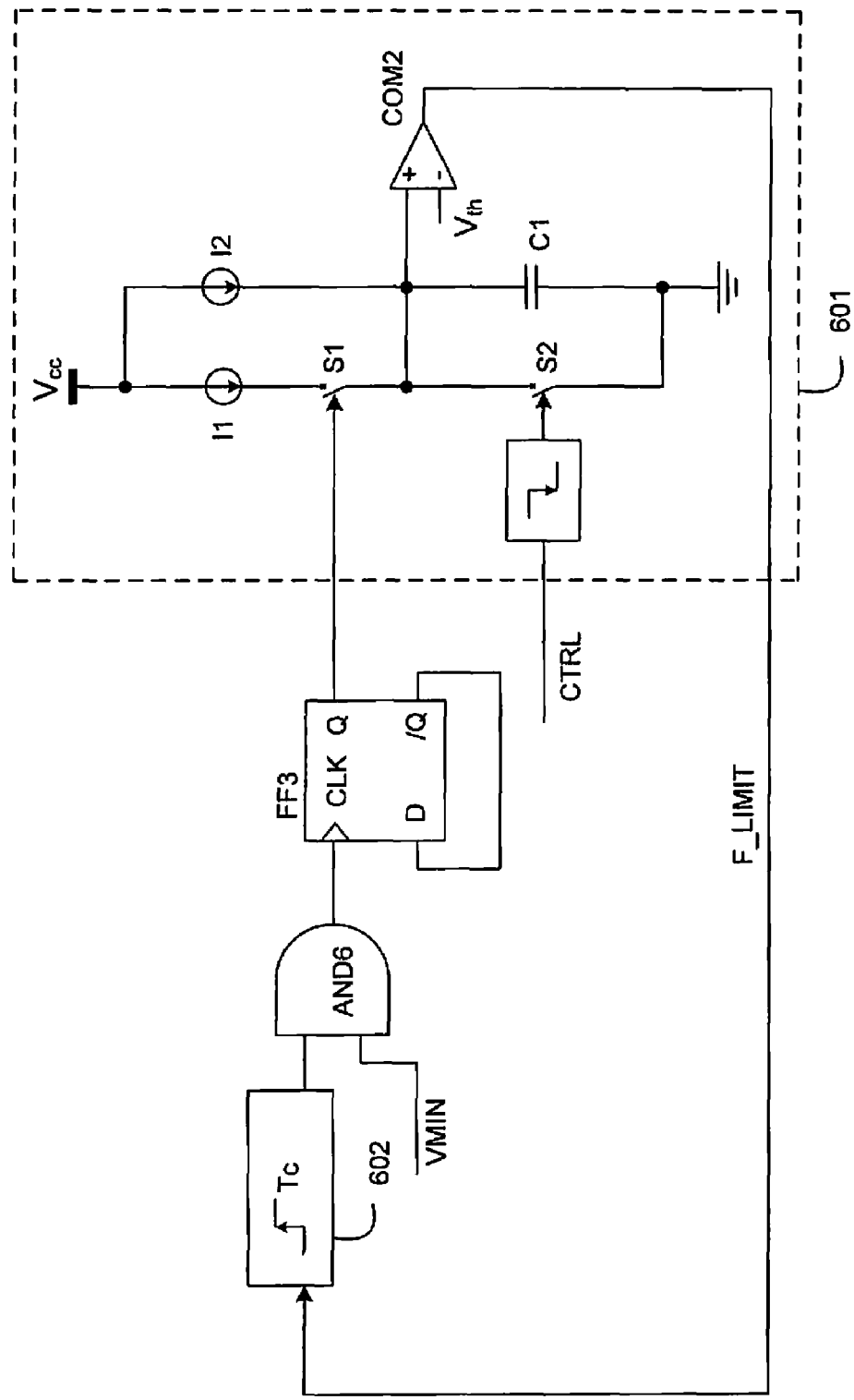
FIG. 6 illustrates the frequency limitation circuit of FIG. 4, in accordance with another embodiment of the present invention.

FIG. 6 illustrates the frequency limitation circuit of FIG. 4, in accordance with another embodiment of the present invention. It comprises a time limitation circuit 601, a one-shot circuit 602, a gate AND6 and a flip-flop FF3. The working principle of the time limitation circuit 601 is similar to that of the time limitation circuits 501 and 502. The time limitation circuit 601 is electrically connected to the logic circuit 407 to receive the control signal CTRL, and generate a time limitation signal accordingly. The time limitation signal becomes LOW at the falling edge of the control signal CTRL. The time limitation signal is used as the frequency limitation signal F_LIMIT, and its LOW duration is the minimum OFF time.

The time limitation circuit 601 comprises current sources I1 and I2, switches S1 and S2, a comparator COM2 and a capacitor C1, connected as shown. The switch S2 is controlled by the control signal CTRL through a one-shot circuit. The switch S2 is turned ON at the falling edge of the control signal CTRL. The capacitor C1 is discharged and the output signal of the comparator COM2 becomes LOW. At any other time, the switch S2 is turned OFF. The capacitor C1 is charged, and the output signal of the comparator COM2 becomes HIGH when the voltage across the capacitor C1 is increased to be larger than the threshold $V_{th}$. As a result, the minimum OFF time is determined by the capacitor C1, the charge current of the capacitor C1 and the threshold $V_{th}$.

The one-shot circuit 602 is electrically connected to the time limitation circuit 601 to receive the time limitation signal and generate a pulse signal accordingly. The pulse signal becomes HIGH at the rising edge of the time limitation signal, and remains HIGH for the time period $T_c$. One input terminal of the gate AND6 is electrically connected to the one-shot circuit 602 to receive the pulse signal. The other input terminal of the gate AND6 is electrically connected to the second comparison circuit 406 to receive the minimum voltage signal VMIN. The flip-flop FF3 comprises a clock terminal CLK, a data terminal D, a non-inverting output terminal Q and an inverting output terminal $\overline{Q}$. The clock terminal CLK is rising edge effective. The data terminal D is electrically connected to the inverting output terminal $\overline{Q}$. The non-inverting output terminal Q is electrically connected to the time limitation circuit 601 to control the ON and OFF of the switch S1. Once the effective minimum voltage signal VMIN appears during the time period after the minimum OFF time, which means the minimum voltage point approaches the minimum OFF time point, the non-inverting output signal of the flip-flop FF3 is reversed. So the minimum OFF time as well as the charging current of the capacitor C1 is changed.

Figure 7:
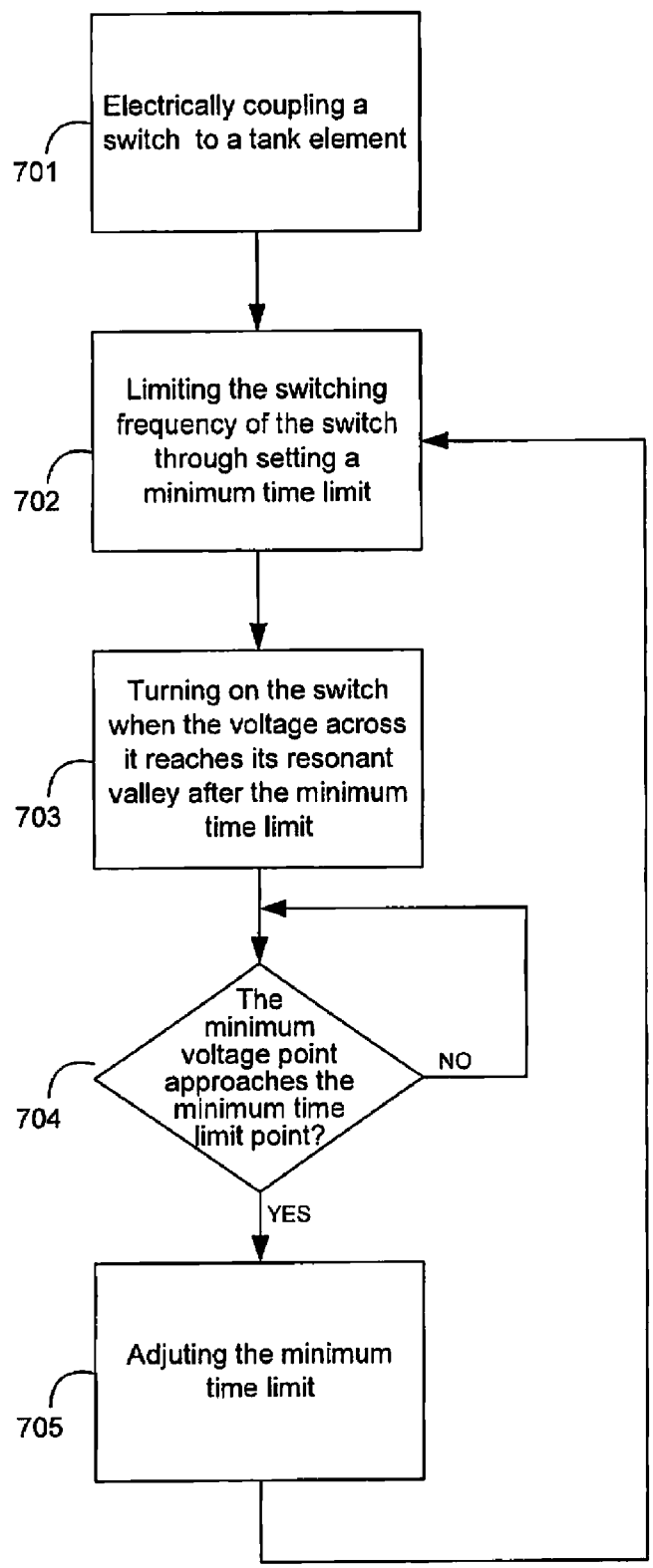
FIG. 7 shows a flow diagram of a method of operating a quasi-resonant switching regulator circuit in accordance with an embodiment of the present invention.

FIG. 7 shows a flow diagram of a method of operating a quasi-resonant switching regulator circuit in accordance with an embodiment of the present invention. The method comprises steps 701~705.

At step 701, a switch is electrically coupled to a tank element. The tank element stores energy when the switch is ON. The stored energy is transferred to the load when the switch is OFF. After all the stored energy is transferred to the load, the tank element becomes resonant with the parasitic capacitance of the switch.

At step 702, a minimum time limit is set to limit the switching frequency of the switch. The minimum time limit may be a minimum OFF time or a minimum switching period.

At step 703, the switch is turned ON when the voltage across the switch reaches its resonant valley after the minimum time limit.

At step 704, monitoring whether the minimum voltage point approaches the minimum time limit point. If yes, go to step 705, else, keep monitoring.

At step 705, the minimum time limit is changed. After then, go to step 702.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A quasi-resonant controlled switching regulator circuit comprising:
   a switch;
   a tank element that is electrically coupled to the switch, the tank element storing energy when the switch is ON, the tank element transferring the stored energy to a load when the switch is OFF;
   a control circuit configured to control switching of the switch; and
   a frequency limitation circuit coupled to the control circuit, the frequency limitation circuit being configured to limit a switching frequency of the switch in accordance with a minimum time limit such that the switch is turned ON when a voltage across the switch reaches a minimum voltage point after the minimum time limit, the frequency limitation circuit being configured to change the minimum time limit to another minimum time limit when the minimum voltage point occurs within a predetermined time period after the minimum time limit.

2. The switching regulator circuit of claim 1, wherein the minimum time limit is a minimum switching period or a minimum OFF time of the switch.

3. The switching regulator circuit of claim 1, wherein the minimum time limit is changed into either a first time limit or a second time limit depending on which of the first or second time limit is a present time limit when the minimum voltage point occurs within the predetermined time period after either the first time limit or the second time limit.

4. The switching regulator circuit of claim 3, wherein the difference between the first time limit and the second time limit is one half of a resonant period of the tank element and a parasitic capacitance of the switch.

5. The switching regulator circuit of claim 3, further comprising:
  a current sensing circuit configured to sense current flowing through the switch to generate a current sensing signal;
  a voltage feedback circuit configured to sense an output voltage of the switching regulator circuit to generate a feedback signal; and
  a switch voltage sensing circuit configured to sense the voltage across the switch to generate a switch voltage sensing signal;
  wherein the control circuit comprises:
    a first comparison circuit coupled to the current sensing circuit and the voltage feedback circuit, and configured to compare the current sensing signal with the feedback signal;
    a second comparison circuit coupled to the switch voltage sensing circuit, and configured to compare the switch voltage sensing signal with a threshold to generate a minimum voltage signal; and
    a logic circuit coupled to the first comparison circuit, the second comparison circuit and the switch, the logic circuit being configured to generate a control signal to control the ON and OFF of the switch based on comparison results of the first and second comparison circuits, wherein the switch is turned OFF when the current sensing signal is larger than the feedback signal and turned ON when the switch voltage sensing signal is smaller than the threshold after the minimum time limit.

6. The switching regulator circuit of claim 5, wherein the frequency limitation circuit is coupled to the second comparison circuit and the logic circuit, and the frequency limitation circuit is configured to determine whether the minimum voltage point is within the predetermined time period after the minimum time limit based on the minimum voltage signal and the control signal.

7. The switching regulator circuit of claim 6, wherein the frequency limitation circuit is configured to set the time period after the minimum time limit, and wherein the minimum time limit is changed into another value if an effective minimum voltage signal is within the time period after the minimum time limit.

8. The switching regulator circuit of claim 7, wherein the length of the predetermined time period after the minimum time limit is one fourth of a resonant period of the tank element and parasitic capacitance of the switch.

9. The switching regulator circuit of claim 7, wherein the frequency limitation circuit comprises:
  a first time limitation circuit configured to generate a first time limitation signal based on the control signal and the first time limit;
  a second time limitation circuit configured to generate a second time limitation signal based on the control signal and the second time limit; and
  a selection circuit configured to select either the first time limitation signal or the second time limitation signal to limit the switching frequency based on the minimum voltage signal.

10. The switching regulator circuit of claim 7, wherein the frequency limitation circuit comprises:
  a time limitation circuit configured to generate a time limitation signal to limit the switching frequency based on the control signal and the minimum time limit;
  a selection circuit configured to change the minimum time limit if an effective minimum voltage signal occurs within the predetermined time period.

11. The switching regulator circuit of claim 10, wherein the time limitation circuit comprises a capacitor, a current source and a comparator, and the minimum time limit is changed by changing a charging current of the capacitor.

12. A method of operating a quasi-resonant switching regulator circuit, the method comprising:
  setting a minimum time limit to limit a switching frequency of a switch that is coupled to a tank element;
  turning ON the switch when a voltage across the switch reaches a minimum voltage point after the minimum time limit;
  determining whether the minimum voltage point occurs within a time period after the minimum voltage point; and
  changing the minimum time limit to another minimum time limit when the minimum voltage point occurs within the time period.

13. The method of claim 12, wherein the minimum time limit is a minimum switching period or a minimum OFF time.

14. The method of claim 12, wherein the minimum time limit is changed into either a first time limit or a second time limit depending on which of the first or second time limit is a present time limit when the minimum voltage point occurs within a predetermined time window after either the first time limit or the second time limit.

15. The method of claim 14, wherein the difference between the first time limit and the second time limit is one half of a resonant period of the tank element and a parasitic capacitance of the switch.

16. The method of claim 14 further comprising:
  sensing a current flowing through the switch to generate a current sensing signal;
  sensing an output voltage of the switching regulator circuit to generate a feedback signal;
  sensing the voltage across the switch to generate a switch voltage sensing signal;
  comparing the current sensing signal with the feedback signal, and turning OFF the switch when the current sensing signal is larger than the feedback signal; and
  comparing the switch voltage sensing signal with a threshold to generate a minimum voltage signal, and turning ON the switch when the switch voltage sensing signal is smaller than the threshold after the minimum time limit.

17. The method of claim 12, wherein the length of the time period is one fourth of a resonant period of the tank element and a parasitic capacitance of the switch.

18. The method of claim 16, further comprising:
generating a first time limitation signal based on a first time limit;
generating a second time limitation signal based on a second time limit; and
selecting either the first time limitation signal or the second time limitation signal to limit the switching frequency based on the minimum voltage signal.

* * * * *